United States Patent
Onoda et al.

(10) Patent No.: US 7,564,163 B2
(45) Date of Patent: Jul. 21, 2009

(54) STRUCTURAL VIBRATION DAMPING DEVICE

(75) Inventors: Junjiro Onoda, Sagamihara (JP); Shinsuke Takeuchi, Sagamihara (JP); Takuya Yabu, Sagamihara (JP)

(73) Assignee: Japan Aerospace Exploration Agency, Tokyo (JP)

( * ) Notice: Subject to any disclaimer, the term of this patent is extended or adjusted under 35 U.S.C. 154(b) by 160 days.

(21) Appl. No.: 11/486,474

(22) Filed: Jul. 14, 2006

(65) Prior Publication Data
US 2007/0052325 A1    Mar. 8, 2007

(30) Foreign Application Priority Data
Sep. 5, 2005    (JP)    ............... 2005-255895

(51) Int. Cl.
*H01L 41/08*    (2006.01)
(52) U.S. Cl. .................. 310/316.01; 310/317; 310/319; 310/321
(58) Field of Classification Search ............ 310/316.02, 310/317, 319, 321, 339
See application file for complete search history.

(56) References Cited

U.S. PATENT DOCUMENTS

| | | | | |
|---|---|---|---|---|
| 4,849,668 | A * | 7/1989 | Crawley et al. | 310/328 |
| 6,580,177 | B1 * | 6/2003 | Hagood et al. | 290/1 R |
| 6,995,496 | B1 * | 2/2006 | Hagood et al. | 310/317 |
| 7,160,286 | B2 * | 1/2007 | Lammer | 606/1 |
| 2004/0152544 | A1 * | 8/2004 | Lammer | 473/520 |
| 2006/0079354 | A1 * | 4/2006 | Lammer | 473/520 |

FOREIGN PATENT DOCUMENTS

| | | |
|---|---|---|
| FR | 2828256 | 2/2003 |
| JP | 2004-132533 | 4/2004 |

OTHER PUBLICATIONS

Hagood, N.W., et al. "Damping of Structural Vibrations with Piezo-electric Materials and Passive Electrical Networks," *Journal of Sound and Vibration*, 1991, pp. 243-268, 146(2).

(Continued)

*Primary Examiner*—Mark Budd
(74) *Attorney, Agent, or Firm*—Blakely, Sokoloff, Taylor & Zafman LLP

(57) ABSTRACT

Disclosed is a structural vibration damping device, which comprises a piezoelectric element adapted to be mounted on a structure, a shunt circuit inserted between two electrodes of the piezoelectric element, and an electric circuit for selectively opening and closing the shunt circuit. In this damping device, the electric circuit is operable, when a voltage between the electrodes of the piezoelectric element has a positive or negative extreme value due to a vibration of the structure, to close the shunt circuit so as to allow a current to flow between the electrodes of the piezoelectric element, and, when the current is reduced to zero, to open the shunt circuit so as to preclude the current flow until a voltage between the electrodes of the piezoelectric element subsequently has the extreme value. Further, each of the shunt circuit and the electric circuit is designed to be operated using only a power generated by the piezoelectric element. The damping device of the present invention makes it possible to achieve high-performance power-free damping with enhanced reliability and maintainability.

15 Claims, 10 Drawing Sheets

OTHER PUBLICATIONS

Hagood, Nesbit W., et al. "Experimental Investigation of Passive Enhancement of Damping for Space Structures," *J. Guidance*, 1991, pp. 1100-1109, vol. 14, No. 6.

Onoda, Junjiro, et al. "Energy-Recycling Semi-Active Method for Vibration Suppression with Piezoelectric Transducers," *AIAA Journal*, Apr. 2003, pp. 711-719, vol. 41, No. 4.

Richard, Claude, et al. "Semi-passive damping using continuous switching of a piezoelectric device," Proceedings of SPIE, Mar. 1999, pp. 104-111, vol. 3672.

Richard, Claude, et al. "Enhanced semi passive damping using continuous switching of a piezoelectric device on an inductor," Proceedings of SPIE, 2000, pp. 288-299, vol. 3989.

Wu, Shu-Yau, et al. "Piezoelectric shunts with a parallel R-L circuit for structural damping and vibration control," SPIE, 1996, pp. 259-269, vol. 2720.

* cited by examiner

STRUCTURAL VIBRATION DAMPING DEVICE

CROSS-REFERENCE TO OTHER APPLICATIONS

The present patent application claims priority from Japanese Patent Application No. 2005-255895, filed on Sep. 5, 2005.

BACKGROUND OF THE INVENTION

1. Field of the Invention

The present invention relates to a damping device for damping a vibration of a structure, such as an aerospace structure including a spacecraft and an aircraft, or a transportation structure including an automobile and an electric train.

2. Description of the Related Art

Generally, a vibration occurring in a structure significantly hinders an intended function of the structure, in most situations.

In observation or imaging of a far-off astronomical object with an extremely high spatial resolution in outer space, or in a spacecraft having a mission to take an image of the earth's surface with an extremely high spatial resolution, a vibration in an observational structure, a support structure thereof or a major structure of the spacecraft becomes a major obstacle to achieving the mission. A vibration in a precision instrument requiring accurate positioning becomes a major obstacle to offering its original performance. Further, a vibration in a building or in a transport machine, such as a vehicle, causes discomfort of users. Thus, there is the need for suppressing these vibrations.

A piezoelectric element serves as a means to bi-directionally convert between vibrational energy and electric energy, and has a property of generating a voltage in response to a force or a strain applied thereto (i.e. piezoelectric effect), and, inversely, generating a strain or a force in response to an electric charge or a voltage applied thereto (i.e. inverse piezoelectric effect). By taking advantage of these effects, the piezoelectric element is widely used as actuators and sensors for vibration control or damping. A damping system for suppressing a vibration is roughly classified into three systems: an active damping system, a passive damping system and a semi-active damping system.

As one example of an active damping system using a piezoelectric element, there has been known a system in which an actuator comprising a piezoelectric element is installed onto a structure, and a voltage or an electric charge is applied to the actuator in such a manner that the piezoelectric element is driven to generate a force for allowing the actuator to cancel a vibration. That is, with the active damping system, some energy may be temporarily supplied to the vibration system from the controller. This fact indicates the possibility of instability of the vibrating system with a poorly designed active damping system.

Typically, the passive damping system is intended to suppress a vibration based on an energy-dissipation effect of a structure itself or a device mounted on a structure. As a passive damping system using a piezoelectric element, there has been known a system designed to convert vibrational energy of a structure into electric energy through a piezoelectric element mounted on the structure, and dissipate the electric energy based on an electric resistance of a shunt circuit connected to the piezoelectric element. There has also been known a damping system using a resonance circuit including a coil to achieve enhanced damping efficiency, so-called "piezoelectric shunt damping system".

The piezoelectric shunt damping system is presented, for example, in the following Non-Patent Publications 1 to 3. FIG. 1 is a circuit diagram showing a fundamental principle of a damping device based on the piezoelectric shunt damping system. In FIG. 1, the reference numeral 2 indicates a piezoelectric element; 4 indicates a coil; and 8 indicates a resistor.

The passive damping system has no need for supply of external energy, and therefore can maintain operational stability. In contrast, its damping performance is generally not so high.

As one example of a semi-active damping system using a piezoelectric element, there has been known a system using a shunt circuit consisting of a piezoelectric element, a resistor and a switch, and a controller adapted to selectively open and close the switch depending on a vibration phase, as presented, for example, in the following Non-Patent Publication 4. This system is designed to effectively convert vibrational energy into electric energy and dissipate the electric energy based on the resistor, according to the switching operation of the switch.

Specifically, in the damping system presented in the Non-Patent Publication 4 by Richard et al., when a displacement or strain of a structure or a voltage generated by a piezoelectric element 2 has a positive or negative extreme value, due to a vibration of the structure, a switch 3 inserted in a piezoelectric element-based shunt circuit illustrated in FIG. 2 is closed, and kept in the closed state only in a short period where an electric charge accumulated in the piezoelectric element 2 is substantially fully discharged. The switch 3 is maintained in an open state during other period. The Non-Patent Publication 4 demonstrates that this system achieves enhanced damping performance as compared with a system using no switch.

As another example of the semi-active damping system using a piezoelectric element, there has been known a system using an electric circuit consisting of a piezoelectric element 2, a coil 4, a switch 3 and a resistor 8, as shown in FIG. 3, and a controller adapted to drive the switch 3 in such a manner that the switch 3 is closed when a displacement of a structure or a voltage generated by the piezoelectric element 2 has a positive or negative extreme value, due to a vibration of the structure, and opened just after a current flowing between the electrodes of the piezoelectric element 2 subsequently is reduced to zero, as presented, for example, in the following Non-Patent Publication 5 by Richard et al., and the following Patent Publication 1. Further, the following Patent Publication 2 presents a system using an improved circuit illustrated in FIG. 4 and proposes an improved switch control rule. In FIG. 4, the reference numeral 2 indicates a piezoelectric element; 4 indicates a coil; 8 indicates a resistor; 9 indicates a switch; 10 indicates a diode; and 11 indicates a diode. The Non-Patent Publication 5 and the following Non-Patent Publication 6 report on the result that the shunt circuit illustrated in FIG. 3 or 4 is operable to accumulate electric energy converted from vibrational energy in the piezoelectric element and the shunt circuit and allow the accumulated energy to be effectively utilized for vibration suppression so as to obtain a particularly-high damping performance.

Generally, these semi-active damping systems provide a higher damping performance as compared with the passive damping systems. In addition, the semi-active damping systems have no need for supply of external energy, and therefore can maintain operational stability, except for an electric power required for driving a control circuit adapted to measure a voltage generated by the piezoelectric element and selectively open and close the switch in the shunt circuit based on the measured information although an amount of the required power is generally small.

[Patent Publication 1] France Patent No. 2828256

[Patent Publication 2] Japanese Patent Laid-Open Publication No. 2004-132533

[Non-Patent Publication 1] Hagood, N. W and von Flotow, A., Damping of Structural Vibrations with Piezoelectric Materials and Passive Electrical Networks, J. Sound and Vibration, 146, 2, 243, 1991

[Non-Patent Publication 2] Hagood, N. W and Crawley, E. F., Experimental Investigation of Passive Enhancement of Damping for Space Structures, J. Guidance, Control and Dynamics, 14, 6, 1100, 1991

[Non-Patent Publication 3] Wu S., Piezoelectric shunts with a parallel R-L circuit for structural damping and vibration control, Proceedings of the International Society for Optimal Engineering, Vol. 2720, pp. 259-269, 1996

[Non-Patent Publication 4] Richard, C., Guyomar D., Audigier, D., Ching, G., Semipassive damping using continuous switching of a piezoelectric device, Proc. SPIE Conf. On Damping and Isolation, Newport Beach, Calif., Mach 1999, SPIE Vol. 3672, pp. 104-111

[Non-Patent Publication 5] Richard, C., Guyomar, D., Audigier D., Bassaler H., Enhanced semi passive damping using continuous switching of a piezoelectric device on an inductor, Proc. SPIE Conf. On Damping and Isolation, Newport Beach, Calif., Mach 2000, SPIE Vol. 3689, pp. 288-299

[Non-Patent Publication 6] Onoda, J., Makihara, K., Minesugi, K., Energy-recycling Semi-Active Method for Vibration Suppression with Piezoelectric Transducers, AIAA Journal, Vol. 41, No. 4, 2003, pp. 711-719

SUMMARY OF THE INVENTION

As mentioned above, the semi-active damping system provides a relatively high damping performance, while maintaining operational stability without the need for supply of external energy except for a relatively small amount of driving power for a control circuit adapted to measure a state of vibration and selectively open and close a switch, differently from the active damping system. In other words, while the conventional semi-active damping system is widely applicable in a significantly convenient manner, it remains a problem about the essential need for supply of the control-circuit driving power.

For example, considering a spacecraft which requires extremely-high reliability and weight reduction even though it is used in circumstances where any maintenance is substantially impossible, it is necessary to provide a damping system capable of completely eliminating the need for supply of external energy including the control-circuit driving power, while maintaining advantages of the semi-active damping system.

The damping system presented in the Non-Patent Publication 1 makes it possible to suppress a vibration with relatively high efficiency without the need for supply of any external energy. However, in cases where the damping system presented in the Non-Patent Publication 1 is used for suppressing a vibration having a relatively low frequency in a commonly-used structure, it has great disadvantages, such as the need for a large inductance, an excessive increase in weight of a required coil, and a limited damping effect only to a vibration having a specific frequency.

It is an object of the present invention to provide a structural vibration damping device capable of solving the above problems.

In order to achieve this object, according to a first aspect of the present invention, there is provided a structural vibration damping device which comprises a piezoelectric element adapted to be mounted on a structure, a shunt circuit inserted between two electrodes of the piezoelectric element, and an electric circuit for selectively opening and closing the shunt circuit. In this structural vibration damping device, the electric circuit is operable, when a voltage between the electrodes of the piezoelectric element has a positive or negative extreme value due to a vibration of the structure, to close the shunt circuit so as to allow a current to flow between the electrodes of the piezoelectric element, and, when the current is reduced to zero, to open the shunt circuit so as to preclude the current flow until a voltage between the electrodes of the piezoelectric element subsequently has the extreme value. Further, each of the shunt circuit and the electric circuit is designed to be operated using only a power generated by the piezoelectric element.

In order to achieve the above object, according to a second aspect of the present invention, there is provided a structural vibration damping device which comprises a first piezoelectric element adapted to be mounted on a vibrating structure, a shunt circuit inserted between two electrodes of the first piezoelectric element, a second piezoelectric element adapted to be mounted on the structure, and an electric circuit for selectively opening and closing the shunt circuit. In this structural vibration damping device, the electric circuit is operable, when a voltage between two electrodes of the second piezoelectric element has a positive or negative extreme value, to close the shunt circuit so as to allow a current to flow between the electrodes of the first piezoelectric element, and, when the current is reduced to zero, to open the shunt circuit so as to preclude the current flow until a voltage between the electrodes of the second piezoelectric element subsequently has the extreme value. Further, each of the shunt circuit and the electric circuit is designed to be operated using only a power generated by the first and second piezoelectric elements.

Preferably, the structural vibration damping device set forth in the first or second aspect of the present invention is designed to allow a current flowing across the shunt circuit to pass through a coil.

In the structural vibration damping device set forth in the first or second aspect of the present invention, the electric circuit may include an extreme-value detection circuit using a peak hold circuit, and a circuit having a function of selectively opening and closing the shunt circuit in response to an output of the extreme-value detection circuit. Further, the peak hold circuit may include a capacitor and a diode.

Alternatively, the electric circuit may include an extreme-value detection circuit using a differentiation circuit, and a circuit having a function of selectively opening and closing the shunt circuit in response to an output of the extreme-value detection circuit. Further, the differentiation circuit may include a capacitor and a resistor.

In the structural vibration damping device set forth in the first or second aspect of the present invention, the electric circuit may be designed to selectively open and close the shunt circuit using a thyristor and a programmable unijunction transistor (PUT). Alternatively, the electric circuit may be designed to selectively open and close the shunt circuit using a field-effect transistor (FET).

The structural vibration damping device of the present invention makes it possible to achieve power-free damping at a high level of performance which has not been conventionally achievable without using an external power. This allows a high-performance damping device to have significantly improved reliability and maintainability while reducing an installation cost, so as to drastically expand the applicable range thereof. In particular, the damping device of the present invention can be suitably used in damping a vibration of a structure including a spacecraft. The Non-Patent Publication 6 shows that the semi-active damping system is effectively applicable to multimode vibration damping. As is evidenced from this fact, the damping device of the present invention is also effective in damping a multimode vibration.

DETAILED DESCRIPTION OF THE PREFERRED EMBODIMENTS OF THE INVENTION

With reference to the drawings, an embodiment of the present invention will now be described. While the following description will be made about one example where a damping device of the present invention is applied to a space structure including a spacecraft, a structure subject to the present invention is not limited to such a specific structure.

First Embodiment

Figure 5:
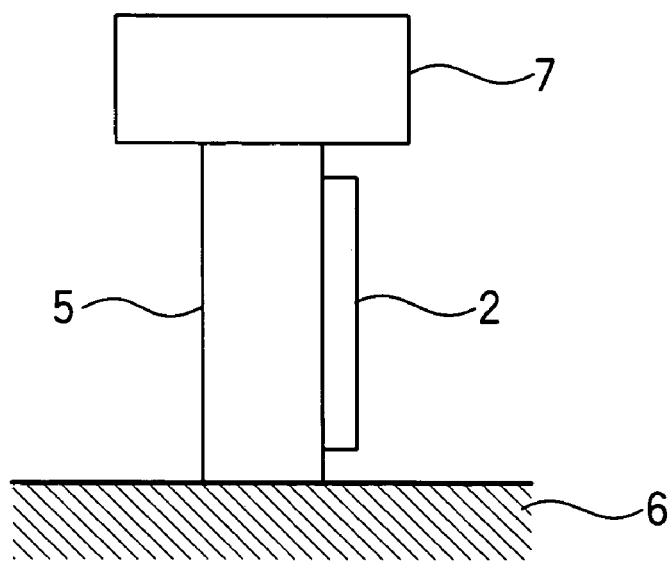
FIG. 5 is a schematic diagram showing a structural vibration damping device according to a first embodiment of the present invention.
Figure 6:
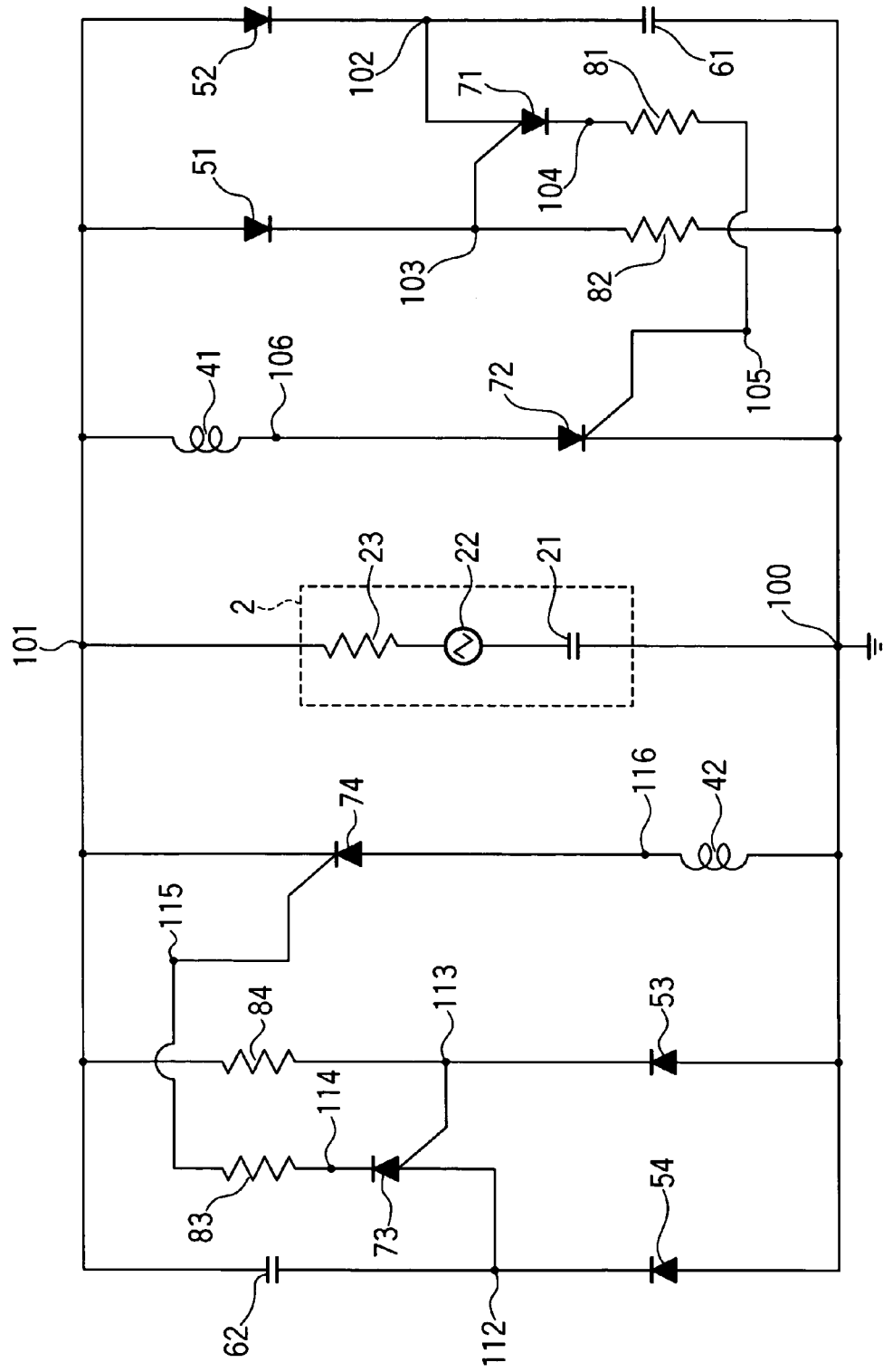
FIG. 6 is an electric circuit diagram showing the structural vibration damping device according to the first embodiment.

Referring to FIG. 5, a dead-weight 7 is supported relative to a stationary base 6 through a structure 5. A piezoelectric element 2 is mounted on the structure 5. In conjunction with a displacement of the dead-weight 7, a strain occurs in the piezoelectric element, and a voltage is generated between two electrodes of the piezoelectric element. A circuit illustrated in FIG. 6 is joined to the piezoelectric element 2. In FIG. 6, the piezoelectric element 2 is illustrated as a combination of a capacitor 21, a voltage generator 22 and a resistor 23.

In this arrangement, a discussion will be firstly made in an initial state when no electric charge is accumulated in the capacitor 21, and the dead-weight 7 is vibrated and moved in a positive direction. As described above, a voltage is generated between the electrodes of the piezoelectric element in conjunction with the movement of the dead-weight 7 in the positive direction. This is equivalent to a state when a positive voltage is generated by the voltage generator 22 in the circuit illustrated in FIG. 6.

In a period where a potential at a point 101 is being increased, a backward voltage is applied to a diode 53, a diode 54 and a thyristor 74, and a thyristor 72 is in its OFF state. Thus, no current flows at respective points 112, 113, 116, 106. In contrast, a current flows at respective points 102, 103, so that an electric charge is accumulated in a capacitor 61, and respective potentials at the points 102, 103 are increased in accordance with the potential at the point 101. In this circuit, a resistor 82 is set at a relatively large resistance value, and the capacitor 61 is set at a capacitance less than that of the capacitor 21. Thus, during the above operation, the current flowing at the points 102, 103 has only a negligible impact on an electric charge accumulated in the capacitor 21.

After the displacement of the vibrating dead-weight 7 reaches a maximum value, it starts decreasing. In conjunction with this decrease, while the voltage generated by the voltage generator 22 starts being lowered to cause a lowering of the potential at the point 103, the potential at the point 102 is kept at a maximum value (constant value) by the action of a diode 52 and the electric charge accumulated in the capacitor 61. That is, a combination of the capacitor 61 and the diode 52 serves as a peak hold circuit. Thus, the potential at the point 102 (i.e. anode potential) becomes greater than the potential at the point 103 (i.e. gate potential), and thereby a programmable unijunction transistor (PUT) 71 is turned on to discharge the electric charge accumulated in the capacitor 61 through the PUT 71, a point 104 and the thyristor 72, so as to allow a current to flow across this path.

In response to the current flowing in a gate terminal of the thyristor 72, the thyristor 72 is turned on to allow a current to flow from the point 101 to a point 100 through the point 106 and the thyristor 72. The current will continue to flow for a certain time by the action of a coil 41 even after the potential at the point 101 becomes zero. Thus, the electric charge accumulated in the capacitor 21 has a negative value, and the current will be reduced to zero after the potential at the point 101 becomes negative. In the piezoelectric element, the resistance value of the resistor 23 is set to be not excessively large.

After the negative electric charge is accumulated in the capacitor 21, the piezoelectric element will generate a force against the dead-weight 7 in the positive direction. The capacitance value of the capacitor 61 and the resistance value of a resistor 81 are set in such a manner that the accumulated electric charge in the capacitor 61 is fully discharged by the above timing to adequately reduce the current flowing at the point 104. Thus, the thyristor 72 is turned off when the current flowing at the point 106 is reduced to zero.

Further, characteristics of respective elements of the electric circuit are selected to allow a time period where the current flows at the point 106 to be fairly less than one cycle of vibration of the structure. Thus, after the potential at the point 101 becomes negative and the negative electric charge is accumulated in the capacitor 21 in the above manner, the vibrating dead-weight will be displaced in a negative direction. During this displacement, the dead-weight 7 is moved in the negative direction against the positive-directional force generated by the piezoelectric element. This makes it possible to reduce vibrational energy and attenuate the vibration of the dead-weight 7.

During the above displacement, the voltage of the voltage generator is gradually lowered and thereby the potential at the point 101 which has already become negative is further lowered. In the period where the potential at the point 101 is being lowered at a negative value, a backward voltage is applied to a diode 51, the diode 52 and the thyristor 72, and the thyristor 74 is in its OFF state. Thus, while no current flows at the points 102, 103, 106, 116, the diodes 54, 53 are applied with a forward voltage and thereby a current flows at the points 112, 113 to allow an electric charge to be accumulated in a capacitor 62. Respective potentials at the points 112, 113 are kept at zero in accordance with a potential at the point 100.

After the displacement of the vibrating dead-weight 7 reaches a negative maximum value, the vibrating dead-weight 7 will start being moved in the positive direction. In conjunction with this movement, the voltage generated by the voltage generator 22 starts being increased. In this period, while the diode 53 is applied with a forward voltage and kept in its ON state to allow the potential at the point 113 to be kept at zero, the diode 54 is applied with a backward voltage due to the electric charge accumulated in the capacitor 62, and turned off to increase the potential at the point 112.

Thus, the potential at the point 112 (i.e. anode potential) becomes greater than the potential at the point 113 (i.e. gate potential), and thereby a PUT 73 is turned on to discharge the electric charge accumulated in the capacitor 62 through the PUT 73, a point 114 and the thyristor 74. Therefore, a current flows in a gate terminal of the thyristor 74 so as to turn on the thyristor 74. In response to turn-on of the thyristor 74, the electric charge accumulated in the capacitor 21 is discharged from the point 100 through a coil 42, the point 116, the thyristor 74 and the point 101, to allow a current to flow across this path. The current will continue to flow for a certain time by the action of a coil 42 even after the potential at the point 101 becomes zero. Thus, the electric charge accumulated in the capacitor 21 has a positive value, and the current will be reduced to zero after the potential at the point 101 becomes positive.

The capacitance value of the capacitor 62 and the resistance value of a resistor 83 are set in such a manner that the accumulated electric charge in the capacitor 62 is fully discharged by the above timing. Thus, the thyristor 74 is turned off when the current flowing at the point 116 is reduced to zero. At this time, the electric charge accumulated in the capacitor 21 has a positive value to allow the piezoelectric element to generate a force in a vibration damping direction. For example, if the dead-weight 7 has a constant vibrational amplitude, an absolute value of the electric charge is increased every half cycle of vibration of the dead-weight 7 for a certain time, and then gradually changed to a constant value.

Figure 1:
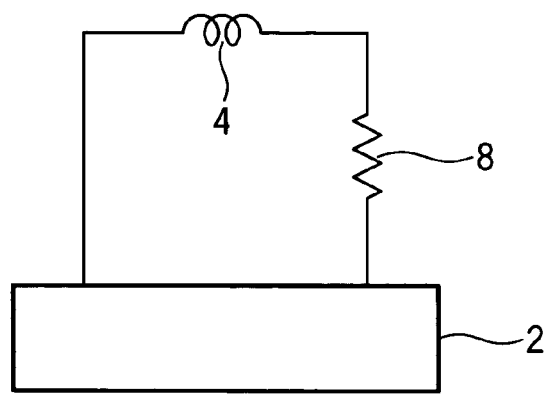
FIG. 1 is a schematic diagram showing a conventional passive damping system using a piezoelectric element.
Figure 2:
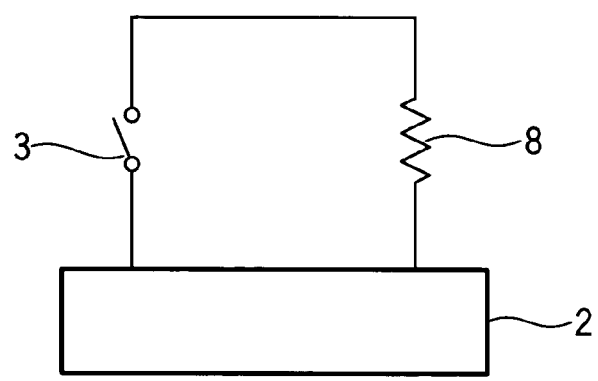
FIG. 2 is a schematic diagram showing a conventional system presented in the Non-Patent Publication 4.
Figure 3:
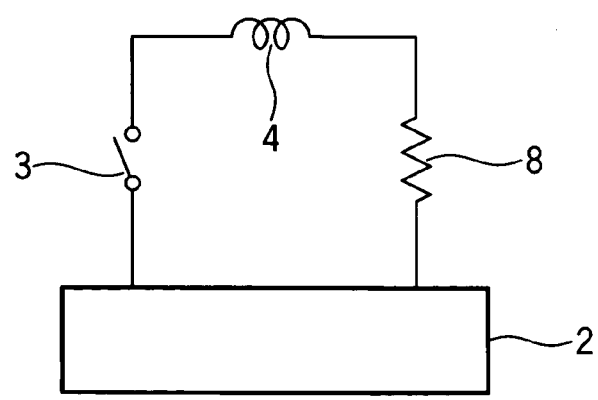
FIG. 3 is a schematic diagram showing a conventional system presented in the Non-Patent Publication 5.
Figure 4:
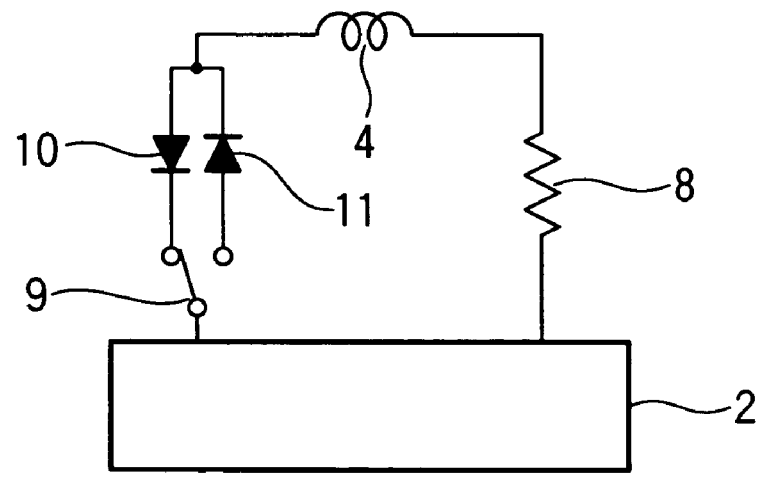
FIG. 4 is a schematic diagram showing a conventional system presented in the Non-Patent Publication 2.

After the electric charge accumulated in the capacitor 21 becomes positive, the piezoelectric element will generate a force in the negative direction to carry out a function of attenuating the vibration of the dead-weight 7 which is successively moved in the positive direction. Based on the repetition of the above operations, a performance equivalent to that of the system presented in the Non-Patent Publication 5 (i.e. a system designed such that a shunt circuit in a circuit including a coil inserted between two electrodes of a piezoelectric element as shown in FIG. 3 is closed just after a voltage generated by the piezoelectric element has a positive or negative extreme value due to a vibration of a structure, and opened just after a current flowing between the electrodes of the piezoelectric element subsequently is reduced to zero) can be achieved using only a passive electric element without a measurement device and/or a controller including a processor, which require an external power.

In the circuit illustrated in FIG. 6, the coils 41, 42 may be omitted. In this case, while an electric charge to be accumulated in the capacitor 21 and a force to be generated by the piezoelectric element will be reduced as compared with the above embodiment, this circuit operates in the same manner as the above embodiment. Thus, a performance equivalent to that of the system presented in the Non-Patent Publication 4 (i.e. a system designed such that a shunt circuit is closed when a voltage generated by a piezoelectric element has a positive or negative extreme value due to a vibration, and then kept in the closed state only in a short period where an electric charge accumulated in the piezoelectric element is substantially fully discharged, wherein the shunt circuit is opened except for the above period) can be achieved using only a passive electric element without a measurement device and/or a controller including a processor, which require an external power.

Second Embodiment

Figure 7:
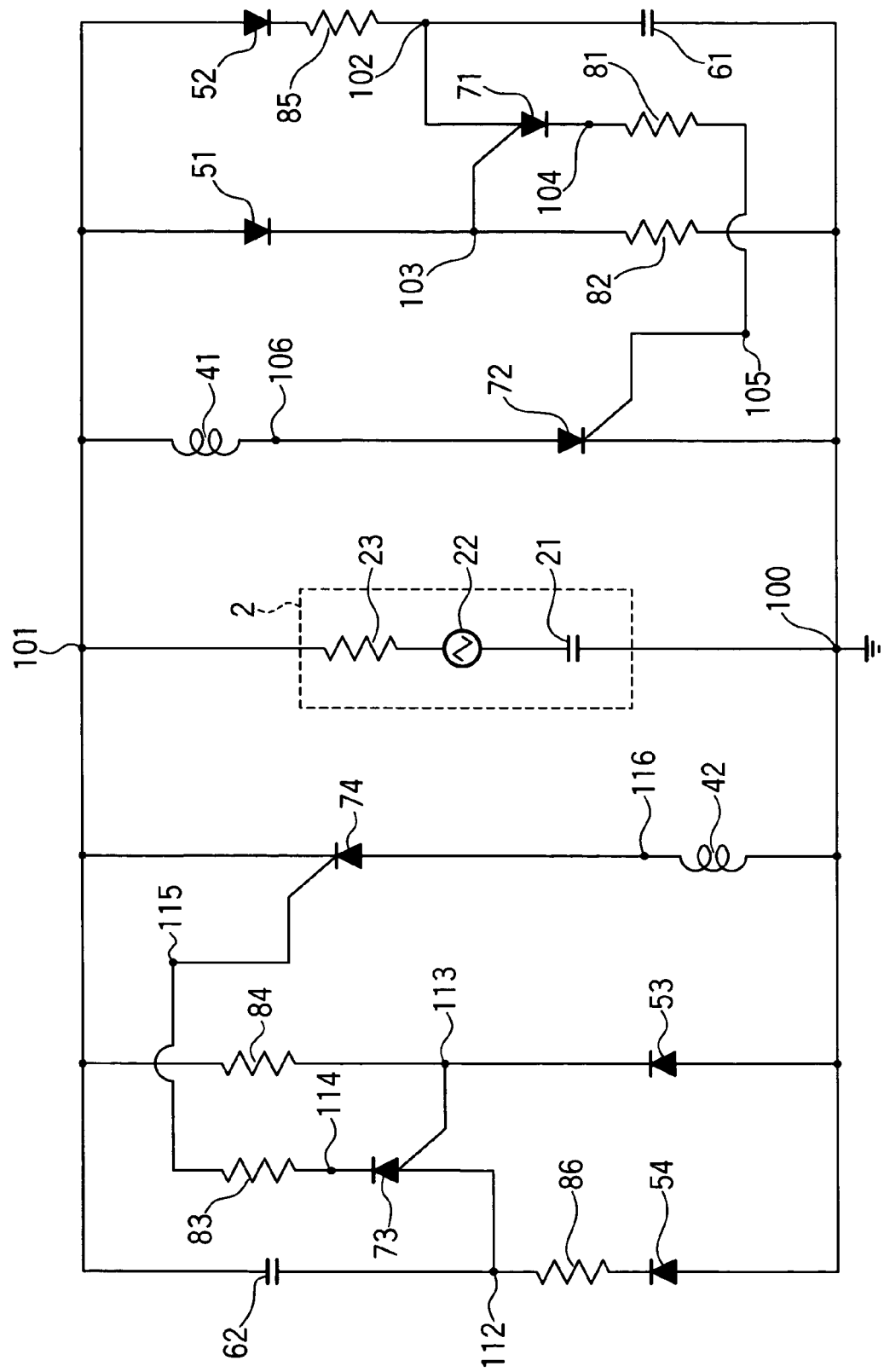
FIG. 7 is an electric circuit diagram showing a structural vibration damping device according to a second embodiment of the present invention.
Figure 8:
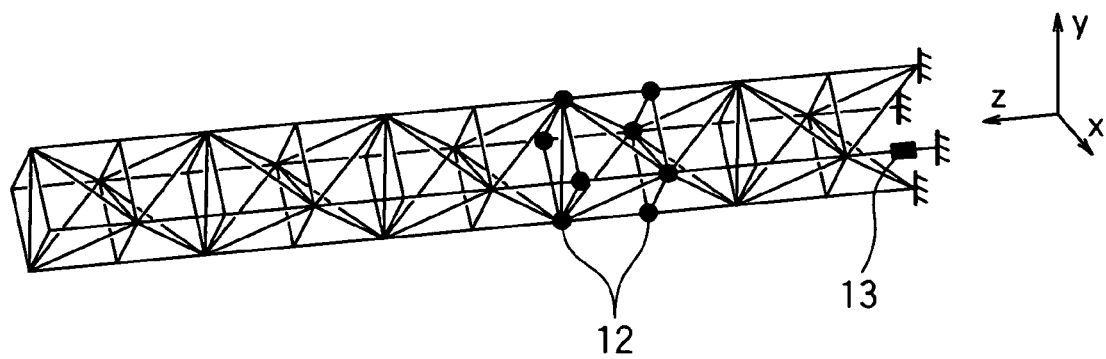
FIG. 8 is a schematic diagram showing the structural vibration damping device according to the second embodiment.

As shown in FIG. 8, a plurality of dead-weights each having a weight of 0.5 kg are mounted on a trussed structure having an overall length of 3.8 m and a total mass of about 7.9 kg, and a commercially available piezoelectric element "ASB171C801NPO" (produced by NEC TOKIN Co.) is incorporated in a member 13 of the trussed structure. This trussed structure has a primary natural frequency of about 11.3 Hz. A shunt circuit as shown in FIG. 7 is connected between two electrodes of the above piezoelectric element. Based on the circuit illustrated in FIG. 6, the circuit illustrated in FIG. 7 additionally includes two resisters 85, 86 to prevent the circuit from too sensitively responding to an unwanted voltage variation mixed in a voltage generated by the piezoelectric element due to a higher mode vibration.

In FIG. 7, each of the coils 41, 42 has an inductance of 10 mH, and each of the capacitors 61, 62 has a capacitance of 0.1 μF. Each of the resistors 81, 83 has a resistance of 100 Ω, and each of the resistors 82, 84 has a resistance of 100 MΩ. Each of the resistors 85, 86 has a resistance of 43 kΩ. Further, each of the coils 41, 42 is not an ideal coil, but it has a resistance of 4.74 Ω. Each of the diodes 51, 52, 53, 54 is composed of V03C produced by Hitachi Ltd., and each of the thyristors 72, 74 is composed of SF16GZ51 produced by Toshiba Co. Each of the PUTs 71, 73 is composed of TN41A produced by Toshiba Co. The piezoelectric element "ASB171C801 NPO" has a performance equivalent to a piezoelectric element in which the capacitor 21 has a capacitance of about 11.5 μF, and the resistor 23 has a resistance of about 3.3 Ω.

Figure 9:
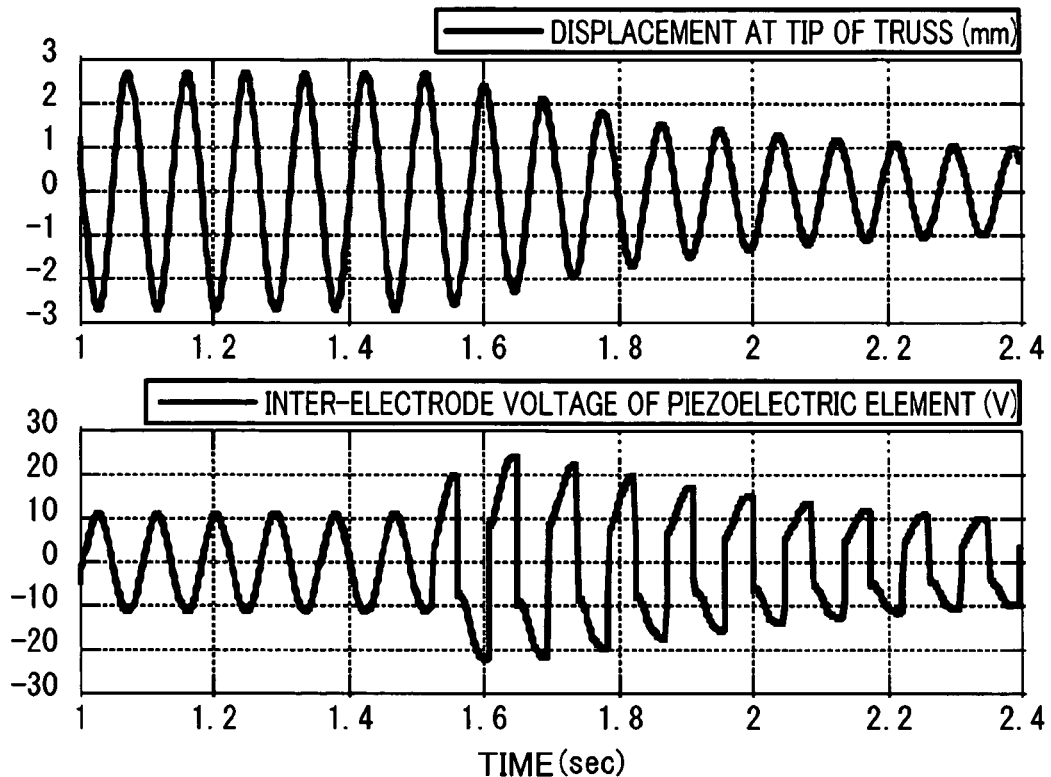
FIG. 9 is a chart showing a time-based record obtained in a damping test using the structural vibration damping device according to the second embodiment.
Figure 9:
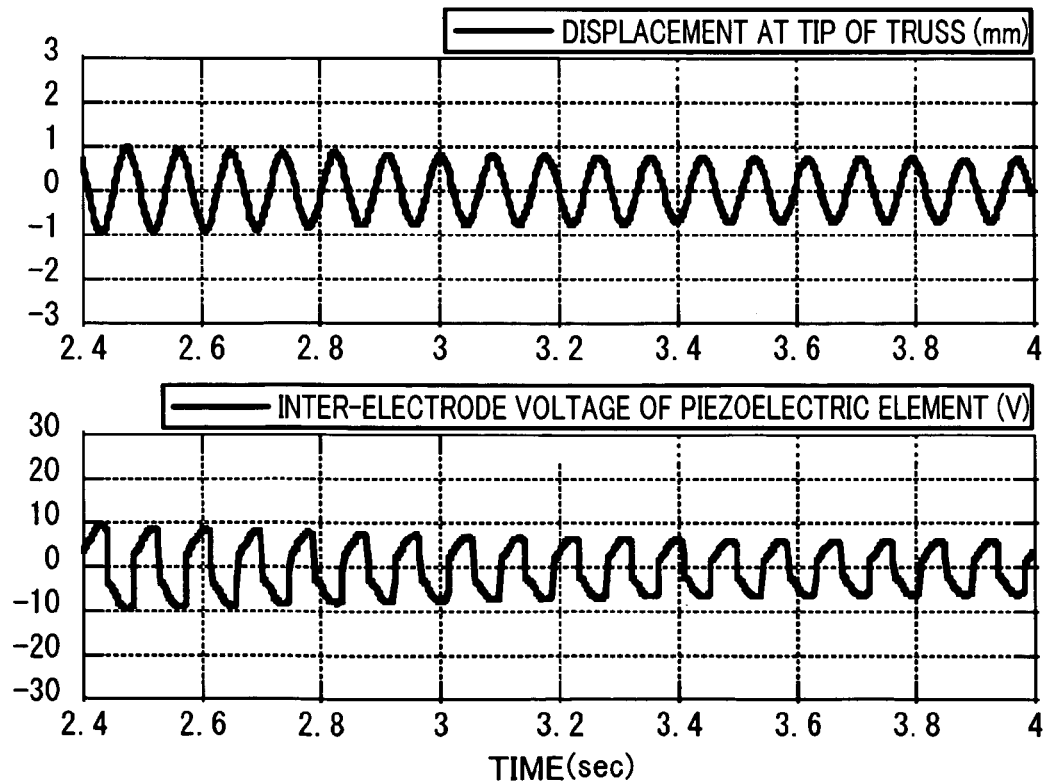

FIG. 9 shows one example of a test result obtained under the following conditions. Without connecting the circuit illustrated in FIG. 7 to the piezoelectric element in the trussed structure, the trussed structure was continuously vibrated by a sine-wave force having a frequency equal to the natural frequency of the trussed structure and a constant vibrational amplitude. After the trussed structure had a steady-state vibration, the circuit illustrated in FIG. 7 was connected to the piezoelectric element. FIG. 9 shows a displacement at a truss edge, and an inter-electrode voltage of the piezoelectric element.

As seen in FIG. 9, after 1.5 sec from the connection of the circuit, a current flows across the shunt circuit through the coil approximately at a time when an inter-electrode voltage of the piezoelectric element has a positive or negative extreme value, and thereby the positive/negative sign of the voltage is inversed, even though the data is not fully accurate because an operating voltage of the semiconductor elements is not zero. Further, despite of a constant exciting or vibrating force, a vibrational amplitude after attachment of the circuit is reduced as compared with a vibrational amplitude before attachment of the circuit. This proves that the vibration can be suppressed to reduce the vibrational amplitude, by inserting the shunt circuit illustrated in FIG. 7 between the electrodes of the piezoelectric element.

Third Embodiment

Figure 10:
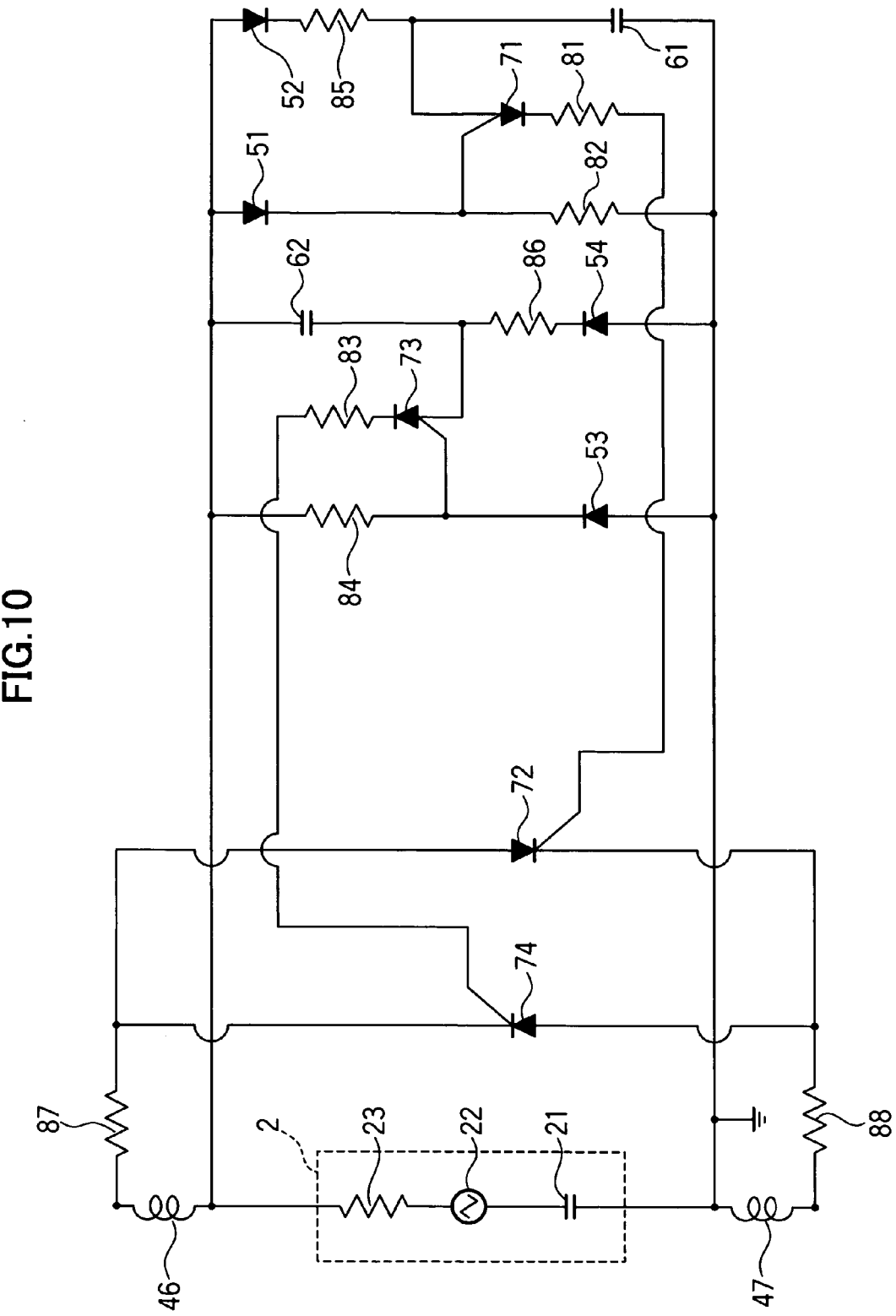
FIG. 10 is an electric circuit diagram showing a structural vibration damping device according to a third embodiment of the present invention.

In the first and second embodiments, two different coils are used for each of the currents flowing across the shunt circuit in the positive direction and in the negative direction. FIG. 10 shows a shunt circuit using a single common coil for both the currents flowing in the positive direction and in the negative direction.

Figure 11:
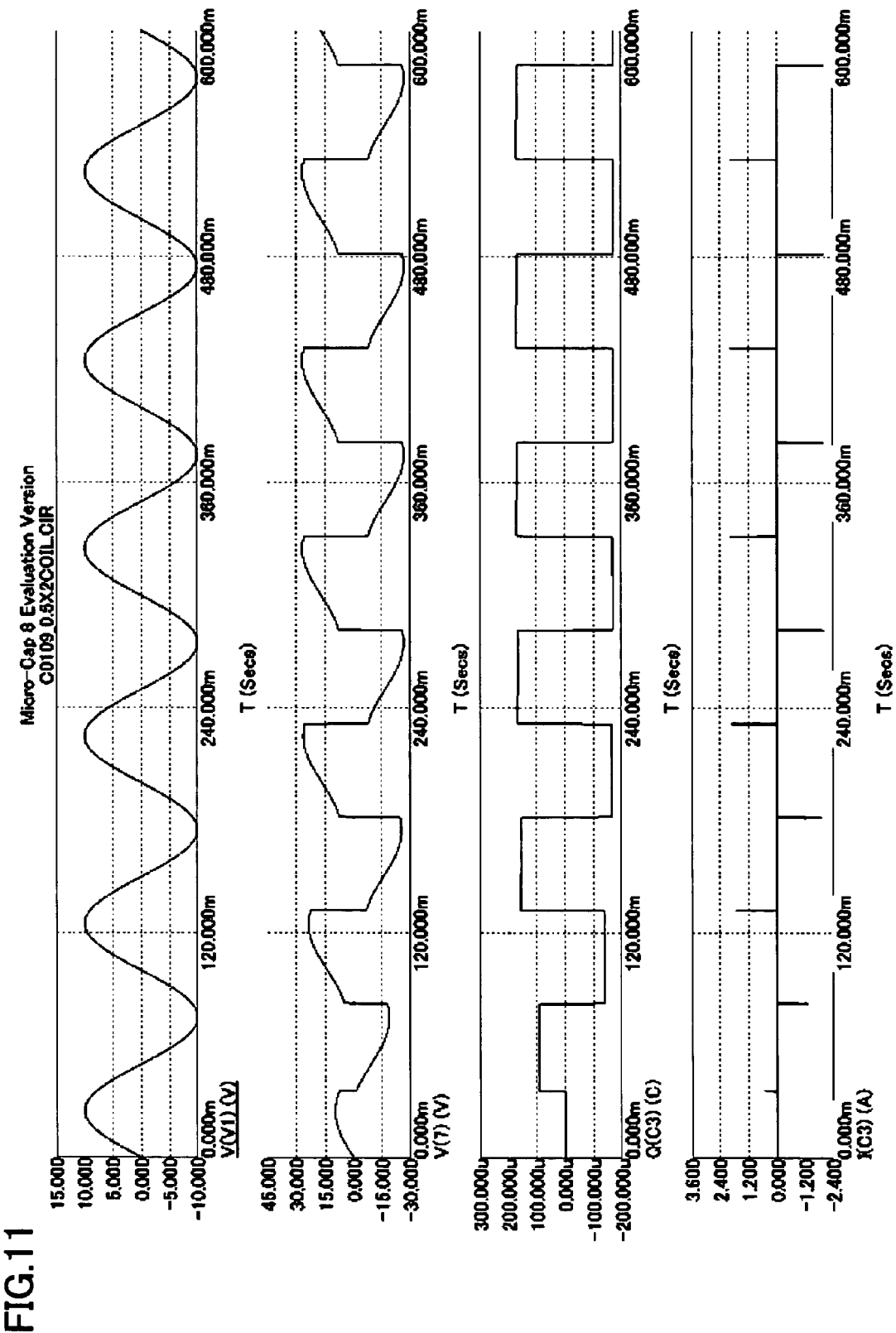
FIG. 11 is a chart showing a time-based record obtained in a numerical simulation for the structural vibration damping device according to the third embodiment.

In FIG. 10, a resistor 23 has a resistance of 1 Ω, and each of two resistances 82, 84 has a resistance of 1 MΩ. Each of two resistances 85, 86 has a resistance of 1 kΩ, and each of two resistances 81, 83 has a resistance of 300 Ω. Each of two coils 46, 47 has an inductance of 0.34 mH, and each of two resistances 87, 88 representing respective resistances of the coils 46, 47 has a resistance of 2 Ω. A capacitor 21 has a capacitance of 10 μF, and each of two capacitors 61, 62 has a capacitance of 0.1 μF. Each of four diodes 51, 52, 53, 56 is based on a numerical modeling equivalent to 6NF11 produced by Toshiba Co., and each of two PUTs 71, 73 is based on a numerical modeling for PUTs provided by Micro-Cap 8. Each of two thyristors 72, 74 is based on a numerical modeling for thyristor provided by Micro-Cap 8. FIG. 11 shows simulation result using a circuit simulation software Micro-Cap 8, about a behavior of the circuit in the third embodiment when a voltage generator 22 generates a voltage having a frequency of 10 Hz and an amplitude of 10 V to simulate the piezoelectric element mounted on a vibrating structure.

FIG. 11 shows a voltage generated by the voltage generator 22, an inter-electrode voltage of the piezoelectric element, an electric charge accumulated in the capacitor 21, and a time-based record of a current flowing through the coil 46, in this order from above. As seen in FIG. 11, the circuit in this embodiment operates according to the intended purpose.

Fourth Embodiment

Figure 12:
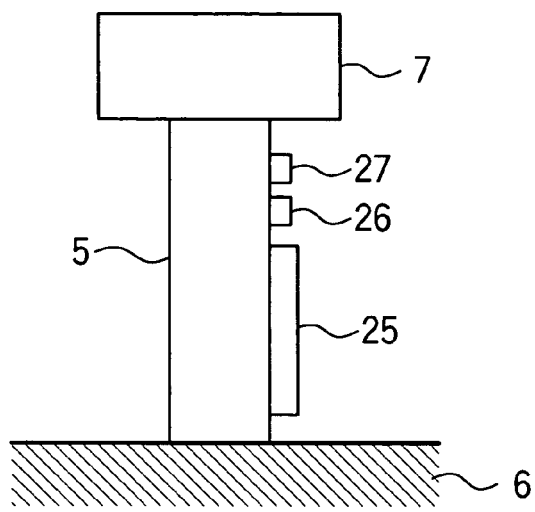
FIG. 12 is a schematic diagram showing a structural vibration damping device according to a fourth embodiment of the present invention.
Figure 13:
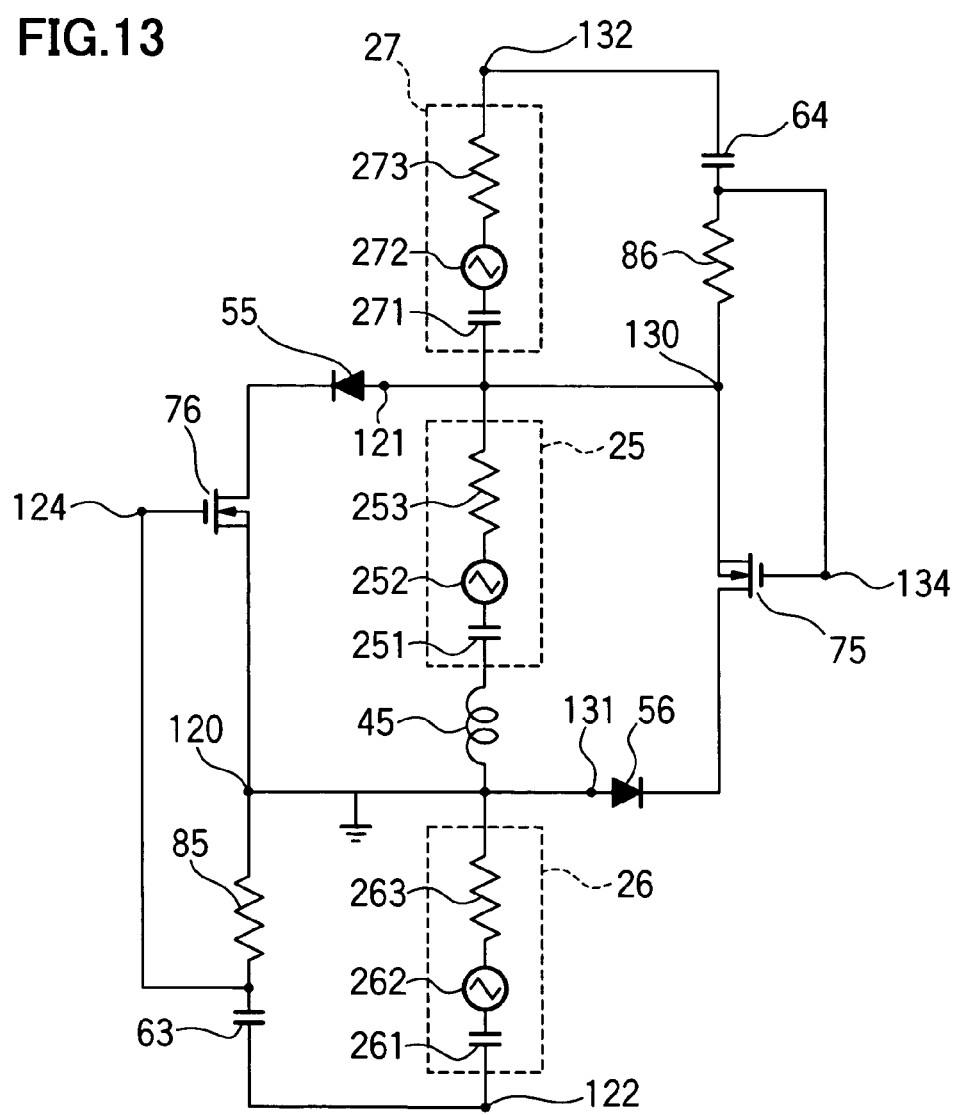
FIG. 13 is an electric circuit diagram showing the structural vibration damping device according to the fourth embodiment.

Referring to FIG. 12, a dead-weight 7 is supported relative to a stationary base 6 through a structure 5. One primary first piezoelectric element 25 and two auxiliary second piezoelectric elements 26, 27 are mounted on the structure 5. In conjunction with a displacement of the dead-weight 7, a strain occurs in each of the piezoelectric elements, and a voltage is generated between two electrodes in each of the piezoelectric element. These piezoelectric elements are connected to an electric circuit illustrated in FIG. 13. In FIG. 13, the first piezoelectric element 25 is illustrated as a combination of a capacitor 251, a voltage generator 252 and a resistor 253. The second piezoelectric element 26 is illustrated as a combination of a capacitor 261, a voltage generator 262 and a resistor 263, and the second piezoelectric element 27 is illustrated as a combination of a capacitor 271, a voltage generator 272 and a resistor 273.

For the purpose of showing a behavior of the circuit illustrated in FIG. 13 in conjunction with the vibration of the dead-weight 7, a discussion will be firstly made in an initial state when no electric charge is accumulated in all of the capacitors, and a displacement and velocity of the dead-weight 7 are zero and positive, respectively. When the piezoelectric elements 25, 26, 27 are mounted at respective positions of the structure where the same strain is generated, each of the piezoelectric elements 25, 26, 27 generates a positive voltage in the same phase in conjunction with the movement of the dead-weight 7 in a positive direction, to reduce a potential at a point 122 and increase a potential at a point 121.

A combination of a capacitor 63 and a resistor 85 serves as a differentiation circuit. Thus, in a period where the potential at the point 122 is being lowered, a potential at a point 124 (i.e. gate potential) becomes less than a potential at a point 120 (i.e. source potential), so that a field-effect transistor (FET) 76 is kept in its OFF state to preclude a current from flowing at the point 121. Further, a backward voltage is applied to a diode 56 to preclude a current from flowing at a point 131, irrespective of a state of a FET 75.

Thus, no current flows through the first piezoelectric element 25, and a shunt circuit for the first piezoelectric element 25 is kept in an open state.

After the displacement of the dead-weight 7 reaches a maximum value, the dead-weight will start being moved in a negative direction. In conjunction with this movement, a voltage of the voltage generator in each of the piezoelectric elements starts being lowered after it reaches an extreme value, and a potential at the point 124 becomes positive by the action of the capacitor 63 and the resistor 85. Thus, the gate potential of the FET 76 becomes greater than the source potential thereof to turn on the FET 76 so as to allow a current to flow from the piezoelectric element 25 and return to the piezoelectric element 25 through the point 121, the FET 76, the point 120 and a coil 45. Along with this current flow, the potential of the point 121 is lowered. The current will continue to flow by the action of the coil 45 even after the potential of the point 121 becomes zero, and the current flow will be stopped after the potential of the point 121 becomes negative. Subsequently, a backward voltage is applied to a diode 55, and thereby the current flowing through the point 121 is reduced to zero. Thus, a negative electric charge is accumulated in the capacitor 251, and the piezoelectric element 25 generates a positive force to the dead-weight 7.

Further, after a voltage of the voltage generator 272 reaches an extreme value and then starts being lowered along with the movement of the dead-weight 7, a potential at a point 130 becomes less than that at a point 134, and thereby the FET 75 is turned off to reduce the current flowing at the point 131 to zero. In the period where the vibrating dead-weight 7 is successively moved in the negative direction, the dead-weight 7 is moved against the positive force generated by the piezoelectric element 25, and thereby the vibration is attenuated. In conjunction with the movement of the dead-weight 7 in the negative direction, the respective voltages generated by the voltage generators 252, 262, 272 are lowered in the same phase and become negative. While the potential at the point 121 which has already been negative is further lowered in the period where the voltage generated by the voltage generator 272 is lowered, no current flows through the point 131 because the potential at the point 130 is kept at a value less than that at the 134 to allow the FET 75 to be kept in its OFF state in this period, and no current flows through the point 121 because a backward voltage is applied to the diode 55 in this period. Thus, the shunt circuit is kept in its opened state.

After the dead-weight 7 is maximally displaced in the negative direction, it will start being moved in the positive direction. In conjunction with this movement, the potential at the point 134 becomes greater than that at the point 130 by the action of a capacitor 64 and a register 86, i.e. a gate voltage of the FET 75 becomes greater than a source voltage thereof, and thereby the FET 75 is turned on to allow a current to flow from the piezoelectric element 25 and return to the piezoelectric element 25 through the coil 45, the point 131, the FET 75 and the point 130.

Subsequently, the potential at the point 130 will be gradually increased. The current will continue to flow by the action of the coil 45 even after the potential at the point 130 becomes zero, and the current flow will be stopped after the potential at the point 130 becomes positive. Subsequently, a backward voltage is applied to the diode 56 to preclude a current from flowing at the point 131. Thus, a positive electric charge is accumulated in the capacitor 251, and the piezoelectric element 25 generates a negative force.

Further, after a voltage of the voltage generator 262 reaches an extreme value and then starts being increased, the potential at the point 124 becomes less than that at the point 120, and thereby the FET 76 is turned off to reduce the current flowing at the point 121 to zero. At this time, the electric charge accumulated in the capacitor 251 is increased from its initial zero value to a positive value. That is, electric energy converted from vibrational energy is accumulated in the capacitor of the piezoelectric element to allow the piezoelectric element to generate a force in a vibration damping direction.

For example, if the dead-weight 7 has a constant vibrational amplitude, an absolute value of the electric charge is increased every half cycle of vibration of the dead-weight 7 for a certain time, and then gradually changed to a constant value. After the electric charge accumulated in the capacitor 251 becomes positive in the above manner, the piezoelectric element will generate a negative-directional force as described above to carry out a function of attenuating the vibration of the dead-weight 7 which is successively moved in the positive direction. Each of the auxiliary second piezoelectric elements is small in size as compared with the primary first piezoelectric element, and a force generated by the second piezoelectric elements is negligible as compared with the force generated by the first piezoelectric element.

Based on the repetition of the above operations, a performance which is equivalent to that of the system presented in the Non-Patent Publication 5 can be achieved without an external power supply in which a shunt circuit including a coil and being inserted between electrodes of a primary first piezoelectric element is closed at the time when a voltage generated by one or more second piezoelectric elements has an extreme value (either positive or negative), and the shunt circuit is opened at the time when the current flowing between the electrodes of the primary first piezoelectric element reduced to zero.

The first piezoelectric element and each of the second piezoelectric elements in this embodiment are mounted at respective positions of the structure where the same strain is generated. Alternatively, in multimode damping for a multi-degree-of-freedom vibration system, a mounting position of the second piezoelectric element may be adjusted irrespective of a mounting position of the first piezoelectric element to select a target vibration mode. It is understood that the FET in this embodiment may also be used in other embodiments to selectively open and close a shunt circuit.

Further, in the circuit illustrated in FIG. 13, the coil 45 may be omitted. In this case, while an electric charge to be accumulated in the capacitor 251 and a force to be generated by the piezoelectric element will be reduced as compared with the above embodiment, this circuit operates in the same manner as the above embodiment. Thus, a performance equivalent to that of the system presented in the Non-Patent Publication 4 (i.e. a system designed such that a shunt circuit is closed when a voltage generated by a piezoelectric element has a positive or negative extreme value due to a vibration, and then kept in the closed state only in a short period where an electric charge accumulated in the piezoelectric element is substantially fully discharged, wherein the shunt circuit is opened except for the above period) can be achieved using only a passive electric element without a measurement device and/or a controller including a processor, which require an external power.

Fifth Embodiment

In FIG. 13, each component was specifically designed as follows. Each of the capacitors 63, 64 had a capacitance of 0.1 μF, and each of the resistors 85, 86 had a resistance of 50 kΩ. Each of the diodes 55, 56 was composed of 6NF11 produced by Toshiba Co., and each of the FETs 75, 76 was based on a numerical modeling equivalent to MTP15N06L produced by Motorola, Inc. The coil 45 had an inductance of 10 mH, and the resistor 253 has a resistance of 4 Ω. The capacitor 251 had a capacitance of 10 μF, and each of the resistors 263, 273 has a resistance of 3 Ω. Each of the capacitors 261, 271 had a capacitance of 0.1 μF. In order to measure a behavior of the above circuit when the piezoelectric elements 25, 26, 27 are mounted on a vibrating structure, each of the voltage generators 252, 262, 272 was designed to generate a sine-wave voltage having a frequency of 10 Hz and a amplitude of 10 V (voltage generator 252) or 30 V (voltage generators 262, 272) in the same phase, and the behavior was simulated using a circuit simulation software Micro-Cap 8. The obtained result is shown in FIG. 14.

Figure 14:
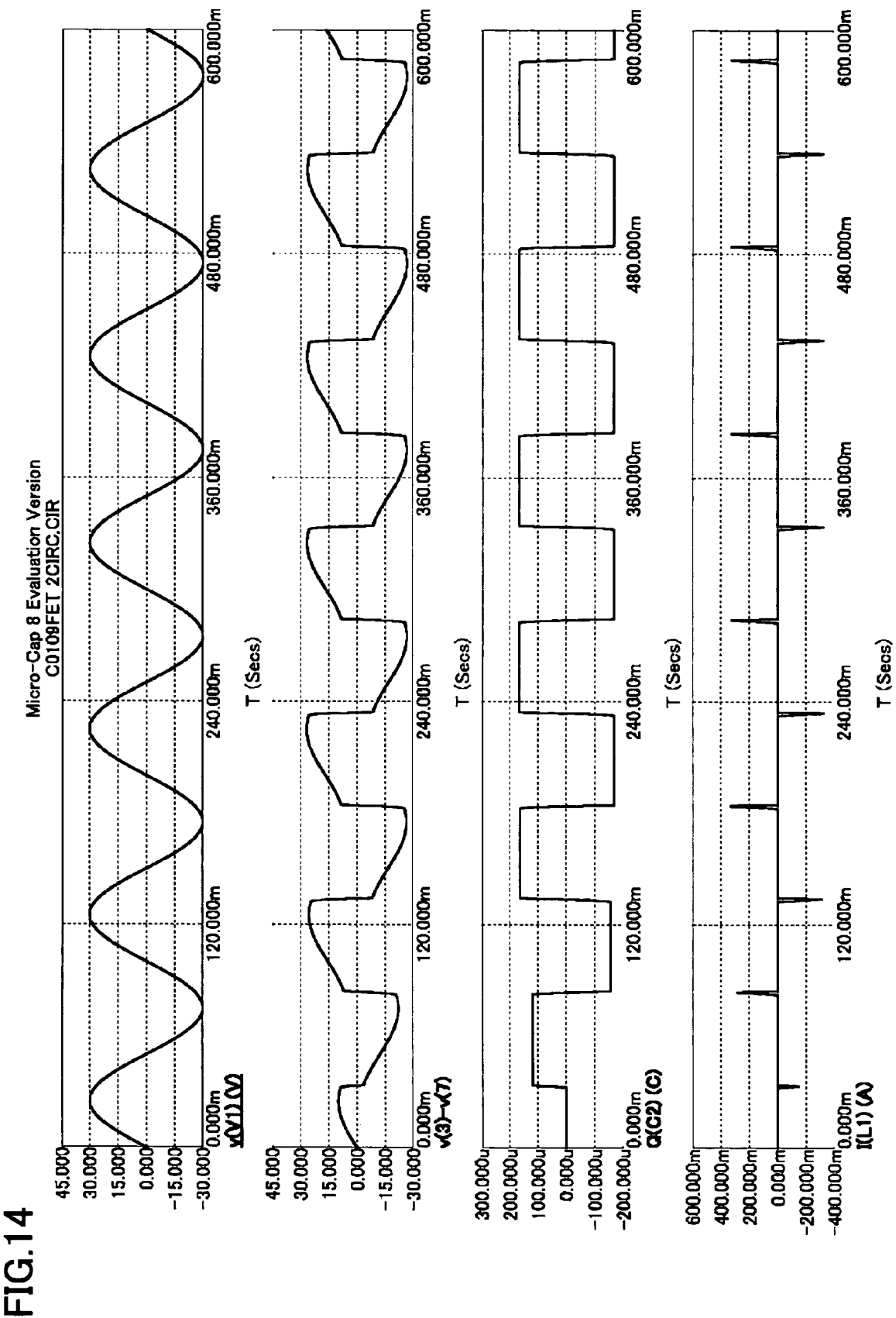
FIG. 14 is a chart showing a time-based record obtained in a numerical simulation for the structural vibration damping device according to the fourth embodiment.

FIG. 14 shows a voltage generated by the voltage generator 262, an inter-electrode voltage of the piezoelectric element 25, an electric charge accumulated in the capacitor 251, and a time-based record of a current flowing through the coil 45, in this order from above. As seen in FIG. 14, the circuit in this embodiment operates according to the intended purpose.

What is claimed is:

1. A structural vibration damping device comprising:
    a piezoelectric element adapted to be mounted on a structure;
    a shunt circuit inserted between two electrodes of said piezoelectric element; and
    an electric circuit for selectively opening and closing said shunt circuit, wherein:
    said electric circuit is operable, when a voltage between the electrodes of said piezoelectric element has a positive or negative extreme value due to a vibration of said structure, to close said shunt circuit so as to allow a current to flow between the electrodes of said piezoelectric element, and, when said current is reduced to zero, to open said shunt circuit so as to preclude the current flow until a voltage between the electrodes of said piezoelectric element subsequently has the extreme value; and
    each of said shunt circuit and said electric circuit is designed to be operated using only a power generated by said piezoelectric element, wherein said electric circuit includes an extreme-value detection circuit using a peak hold circuit, and a circuit having a function of selectively opening and closing said shunt circuit in response to an output of said extreme-value detection circuit.

2. The structural vibration damping device as defined in claim 1, which is designed to allow a current flowing across said shunt circuit to pass through a coil.

3. The structural vibration damping device as defined in claim 1, wherein said peak hold circuit includes a capacitor and a diode.

4. A structural vibration damping device comprising:
a piezoelectric element adapted to be mounted on a structure;
a shunt circuit inserted between two electrodes of said piezoelectric element; and
an electric circuit for selectively opening and closing said shunt circuit, wherein:
said electric circuit is operable, when a voltage between the electrodes of said piezoelectric element has a positive or negative extreme value due to a vibration of said structure, to close said shunt circuit so as to allow a current to flow between the electrodes of said piezoelectric element, and, when said current is reduced to zero, to open said shunt circuit so as to preclude the current flow until a voltage between the electrodes of said piezoelectric element subsequently has the extreme value; and
each of said shunt circuit and said electric circuit is designed to be operated using only a rower generated by said piezoelectric element, wherein said electric circuit includes an extreme-value detection circuit using a differentiation circuit, and a circuit having a function of selectively opening and closing said shunt circuit in response to an output of said extreme-value detection circuit.

5. The structural vibration damping device as defined in claim 4, wherein said differentiation circuit includes a capacitor and a resistor.

6. The structural vibration damping device as defined in claim 1, wherein said electric circuit is designed to selectively open and close said shunt circuit using a thyristor and a programmable unijunction transistor.

7. The structural vibration damping device as defined in claim 1, wherein said electric circuit is designed to selectively open and close said shunt circuit using a field-effect transistor.

8. A structural vibration damping device comprising:
a first piezoelectric element adapted to be mounted on a vibrating structure;
a shunt circuit inserted between two electrodes of said first piezoelectric element;
one or more second piezoelectric elements adapted to be mounted on said structure; and
an electric circuit for selectively opening and closing said shunt circuit, wherein:
said electric circuit is operable, when a voltage between two electrodes of said one or more second piezoelectric elements have a positive or negative extreme value, to close said shunt circuit so as to allow a current to flow between the electrodes of said first piezoelectric element, and, when said current is reduced to zero, to open said shunt circuit so as to preclude the current flow until a voltage between the electrodes of said one or more second piezoelectric elements subsequently have the extreme value; and
each of said shunt circuit and said electric circuit is designed to be operated using only a power generated by said first and second piezoelectric elements.

9. The structural vibration damping device as defined in claim 8, which is designed to allow a current flowing across said shunt circuit to pass through a coil.

10. The structural vibration damping device as defined in claims 8, wherein said electric circuit includes an extreme-value detection circuit using a peak hold circuit, and a circuit having a function of selectively opening and closing said shunt circuit in response to an output of said extreme-value detection circuit.

11. The structural vibration damping device as defined in claim 10, wherein said peak hold circuit includes a capacitor and a diode.

12. The structural vibration damping device as defined in claim 8, wherein said electric circuit includes an extreme-value detection circuit using a differentiation circuit, and a circuit having a function of selectively opening and closing said shunt circuit in response to an output of said extreme-value detection circuit.

13. The structural vibration damping device as defined in claim 12, wherein said differentiation circuit includes a capacitor and a resistor.

14. The structural vibration damping device as defined in claim 8, wherein said electric circuit is designed to selectively open and close said shunt circuit using a thyristor and a programmable unijunction transistor.

15. The structural vibration damping device as defined in claim 8, wherein said electric circuit is designed to selectively open and close said shunt circuit using a field-effect transistor.

* * * * *